United States Patent
Sørensen (10) Patent No.: US 6,889,901 B2
(45) Date of Patent: May 10, 2005

(54) DEVICE FOR CONVEYING PRODUCTS (75) Inventor: Per Sørensen, Oslo (NO)

(73) Assignee: Zopa AS, Oslo (NO)

( * ) Notice: Subject to any disclaimer, the term of this patent is extended or adjusted under 35 U.S.C. 154(b) by 128 days.

(21) Appl. No.: 10/332,952

(22) PCT Filed: Jul. 13, 2001

(86) PCT No.: PCT/NO01/00303
§ 371 (c)(1),
(2), (4) Date: Jan. 14, 2003

(87) PCT Pub. No.: WO02/06143
PCT Pub. Date: Jan. 24, 2002

(65) Prior Publication Data
US 2003/0183489 A1 Oct. 2, 2003

(30) Foreign Application Priority Data
Jul. 14, 2000 (NO) .......................... 20003637

(51) Int. Cl.$^7$ ............................................. G06K 11/00
(52) U.S. Cl. ...................... 235/385; 902/29; 235/383
(58) Field of Search .................. 902/29; 235/478–479, 235/385, 383; 198/347.1, 655, 301, 318, 665

(56) References Cited

U.S. PATENT DOCUMENTS

| 4,049,130 A | | 9/1977 | Bell | |
|---|---|---|---|---|
| 4,339,026 A | * | 7/1982 | Base et al. ............... | 198/347.3 |
| 4,540,325 A | | 9/1985 | Heisler | |
| 4,645,035 A | * | 2/1987 | Bavis .......................... | 186/37 |
| 4,646,035 A | * | 2/1987 | Chapelle ................. | 331/177 R |
| 4,678,074 A | | 7/1987 | Focke et al. | |
| 4,917,227 A | * | 4/1990 | Matsuo et al. ........... | 198/347.1 |
| 5,305,808 A | * | 4/1994 | Rasmussen et al. ........ | 141/169 |
| 5,361,891 A | * | 11/1994 | Greene et al. .............. | 198/797 |
| 5,392,897 A | * | 2/1995 | Akesaka ..................... | 198/604 |
| 5,586,686 A | | 12/1996 | Bustos et al. | |
| 5,992,844 A | * | 11/1999 | Dillinger et al. ............ | 271/182 |
| 6,155,400 A | * | 12/2000 | Daigh et al. ................ | 198/301 |
| 6,322,295 B1 | * | 11/2001 | Gabriele ..................... | 406/84 |

FOREIGN PATENT DOCUMENTS

| FR | 1553580 | 1/1969 |
|---|---|---|
| FR | 2 266 229 | 10/1975 |
| NO | 995969 | 12/1999 |
| SE | 515771 | 10/1999 |
| WO | WO 95/12182 | 5/1995 |
| WO | 99/55606 | 11/1999 |
| WO | 99/63287 | 12/1999 |
| WO | 01/40088 A1 | 6/2001 |

* cited by examiner

Primary Examiner—Thien M. Le
Assistant Examiner—Edwyn Labaze
(74) Attorney, Agent, or Firm—Young & Thompson (57) ABSTRACT The invention relates to a device for controlled conveying of products (2), such as drinks cans or bottles from an intake (3) at a first height level to an outlet (5) at a second height level. The device comprises a substantially vertical conveyor duct (4), which is arranged to contain a plurality of axially stacked products (2) and which forms a transport path from the intake (3) to the outlet (5), a sensor device arranged to provide a signal expressing that a product has been removed from the outlet (5) conveyor devices, arranged to perform a repeatable convey cycle for controlled conveying of a product to the outlet, and a control device, arranged to implement the convey cycle on the basis of the said signal. In a preferred embodiment the conveyor device' comprises a seat (6) which protrudes through a gap extending in the conveyor duct's longitudinal direction, and which is controllably movable in the conveyor duct's longitudinal direction, and in addition a blocking device (7).

13 Claims, 6 Drawing Sheets

DEVICE FOR CONVEYING PRODUCTS

FIELD OF THE INVENTION

The invention relates to a device for conveying products.

BACKGROUND OF THE INVENTION

In the retail trade it is desirable to be able to deliver and present products at specific locations, for example in a shop. It is particularly desirable to be able to present products such as filled canned and bottled drinks at defined, sales-promotional locations to which the customers' attention can easily be drawn, for example above or near a cash desk. Lack of space and aesthetic considerations make such locations unsuitable for installing a traditional storage and display unit, such as for example a shelf, a counter or a refrigerating unit.

WO-99/55606 discloses a transport system for processing of returnable drinks cans. The containers are transported end-to-end in a channel. The system comprises a drive device with a pneumatic cylinder and a piston, connected via a piston rod to a plate. The plate is arranged to push a stack of containers through the following duct channel. A sensor detects the presence of a container, and is employed for control of the drive device. The system cannot be considered to comprise a conveyor device for conveying products from a first height level to a second height level different from the first height level, where the conveyor device comprises both a propulsion device which, during a period of a conveyor cycle, moves a product in the product's longitudinal direction, in addition to a retaining device which, during a period of a conveyor cycle, holds a product back in order to counteract undesired movement due to the weight of the product. The system in the publication is adapted to suit returnable empties, and cannot be considered to be suitable for delivery of products such as filled drinks containers at defined, sales-promotional locations.

An initial task that forms the basis of the invention is to provide a device for supplying and presenting products in an area with limited space.

A solution to this initial task is presented in WO-99/63287, belonging to the applicant. A transport system for chilled products such as cans and bottles is disclosed herein. The publication states that containers can be transported and stored in a duct system from a store to a delivery unit installed in a shop. In one embodiment the duct system comprises a transport path with a horizontal section located at ceiling level in height, and a vertical or slanting downwardly directed delivery unit, which brings the products down to a lower height level for delivery. Such a system permits a delivery unit to be placed in a location with limited space, for example above a cash desk.

The publication, however, does not describe detailed solutions for providing a controlled conveying of products from the higher-located, horizontal conveyor path for delivery at a second height level. An object of the present invention, therefore, is to provide a device for controlled transport of products with two end surfaces, such as substantially cylindrical products, from a product intake at a first height level to a product outlet at a second height level, different from the first height level. This means that when a product is removed from the product outlet, a succeeding product will be advanced as quickly as possible to the product outlet.

SUMMARY OF THE INVENTION

According to the invention this is achieved by the device comprising a substantially vertical conveyor duct which is arranged to contain a plurality of axially stacked products, and which forms a transport path from the intake to the outlet, a sensor device, arranged to provide a signal expressing that a product has been removed from the outlet, feed devices which are arranged to implement a repeatable convey cycle for controlled conveying of one product to the outlet, and a control device which is arranged to initiate the convey cycle on the basis of the said signal.

The feed devices comprise a propulsion device, arranged to act during a period of a convey cycle with a force on at least a part of an end surface of a product, and to move the product a length corresponding substantially to the length of a product, parallel to the main direction, and a retaining device, arranged to act for at least a period of a convey cycle with a force on at least a part of the surface of a product. The propulsion device provides the actual transport of the products, while the retaining device helps to counteract undesired movement due to the weight of the product.

In particular, the propulsion device may comprise a seat which protrudes through a gap extending in the conveyor duct's longitudinal direction, and which is arranged to act with a force on the lower end surface of a product located on the top of the seat, and which is controllably movable in a direction parallel to the conveyor duct's longitudinal direction. If the transport direction is upwards, the seat's function is to lift both the product concerned and the axially stacked products located above. If the transport direction is downwards, the seat's function may be partly to lift both the product concerned and the axially stacked products located above over a short distance, but in this case the main function will be to support the stack of products as they are driven by means of their weight downwards in the conveyor duct.

The propulsion device also advantageously comprises a screw which extends parallel to the conveyor duct's longitudinal direction, and which is rotatable by means of a motor, preferably via a gear device. On the screw there extends an internally threaded sleeve with an extension, which forms the seat. Since the seat projects through the gap in the conveyor duct's longitudinal direction, the sleeve is prevented from rotating, while the sleeve is allowed to be moved in the conveyor duct's longitudinal direction. By means of this arrangement the seat can be moved upwards or downwards in a controlled fashion, controlled by power to the motor.

In a second embodiment the propulsion device comprises instead a piston device, driven by an electric or pneumatic actuator, arranged to controllably exert a force on a part of an end surface of a product. In this case the propulsion device is installed at an end of the conveyor duct, and the piston device pushes a product and the succeeding products into the duct.

In an embodiment the said retaining device comprises a blocking device, which is controllably movable in a direction substantially perpendicular to the conveyor duct's longitudinal direction, between a first position where the blocking device prevents a product, which is located above from passing, and a second position where the blocking device permits the product to pass. This means that during the period when the conveyor device is not actively moving or holding the whole stack of products in the conveyor duct, in its first position the blocking device will ensure that the products do not fall down.

In a special embodiment the blocking device is controllably movable by means of a spring-prestressed electrical solenoid. The blocking device may particularly advantageously be arranged in such a manner that it is kept in its first position by means of the prestressing when the solenoid is not electrically activated.

In an alternative embodiment the retaining device comprises friction means, particularly in the form of brushes, mounted on at least a portion of the internal wall of the conveyor duct, arranged to act with a frictional force substantially perpendicularly from the wall, on at least a part of the surface of at least one product in the duct. The friction means are of such a size and design that they overcome the products' own weight. This is appropriate in those cases where the retaining device does not require to be capable of being deactivated.

As an alternative to the conveyor devices comprising the combination of propulsion and retaining devices, in one embodiment the conveyor devices comprise an endless conveyor belt, driven by at least one roller, which conveyor belt is equipped with seats which protrude from the conveyor belt through a gap extending in the conveyor duct's longitudinal direction, which seats support a product, with the result that a controlled guidance of the conveyor belt leads to a controlled transport of products. Each seat is preferably attached to the conveyor belt by a hinged device. The conveyor belt can extend along a part of the conveyor duct, with the succeeding products pushing one another along the remaining part of the duct.

The device may be designed with the second height level lower than the first height level, thus providing a controlled lowering, or with the second height level higher than the first height level, thus providing a controlled lifting. In both cases the object can be achieved that products are conveyed to defined, sales-promotional locations, with space and aesthetic considerations being taken into account.

The device may advantageously also comprise sensors for providing sensor signals, including position measurements and/or proximity measurements, and the control device may advantageously comprise at least one processing device and a storage device for generating control signals for controlling motors, actuators and/or solenoids, and be arranged to generate the control signals on the basis of the sensor signals, and on the basis of criteria programmed to be executed by the control device and data contained in the storage device.

BRIEF DISCRIPTION OF THE DRAWINGS

The device according to the invention will now be described in greater detail by means of embodiments illustrated in the drawings, in which.

DETAILED DESCRIPTION OF THE INVENTION

Figure 1:
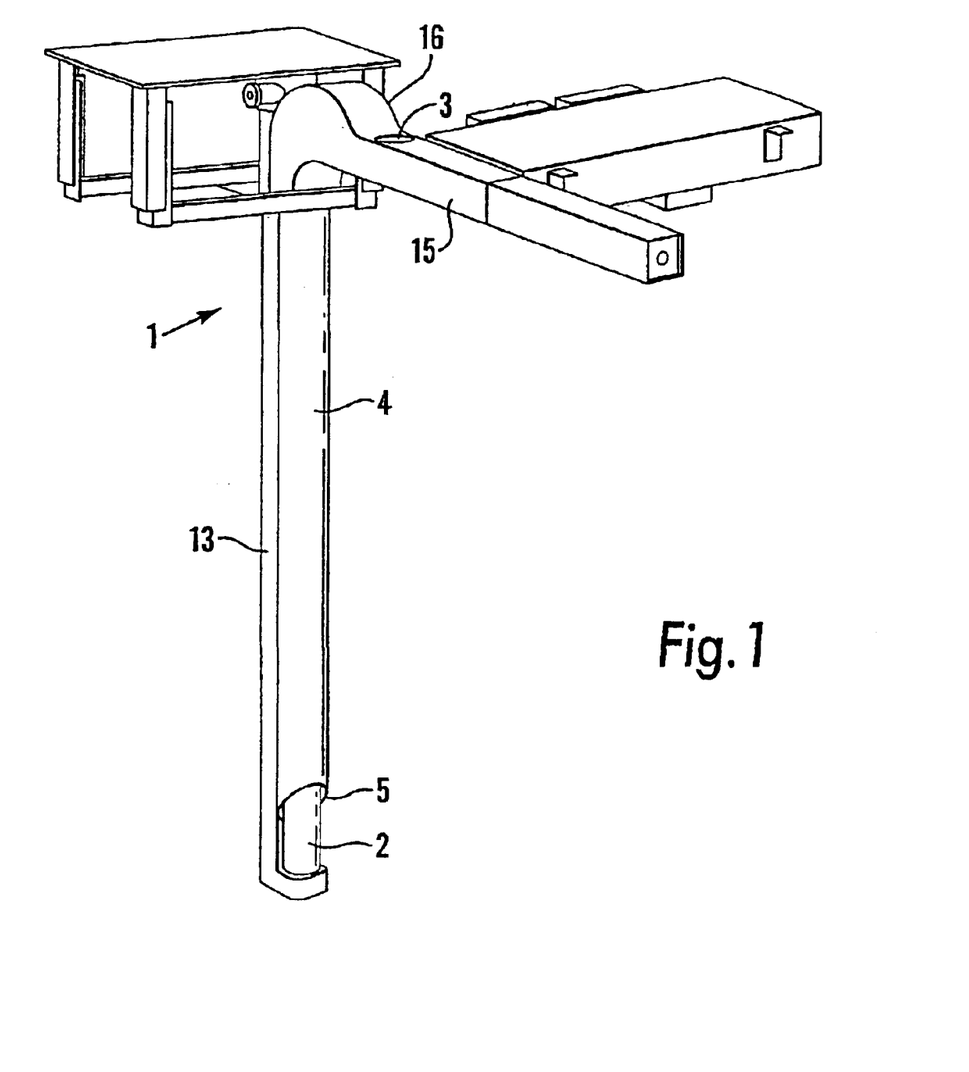
FIG. 1 is a perspective view of a system in which a device according to the invention is included.

FIG. 1 is a perspective view illustrating a system for conveying and delivering products, in which a device according to the invention is included. The system comprises a transport device 15, arranged on a first, higher-located height level, for example under the ceiling in sales and/or storage premises. The products are transferred from the transport device to supply a storage device, arranged for storing a number of products 2. The products are preferably drinks containers. The products are conveyed from the transport device 15 to the intake 3 on the device 1, through a curved, substantially 90° angled or variably angled duct or channel section 16, which is designed with an enlarged cross section at the curve, thus enabling products 12 to be transferred unimpededly through the channel section from, a horizontal to a vertical state. From here the products are transported and stored in the substantially vertical conveyor duct 4 to the outlet 5. On the rear of the conveyor duct 4, i.e. the opposite side of the central part of the opening that forms the outlet 5, a channel 13 is provided which extends along the conveyor duct. The channel 13 is arranged partly in order to enclose the conveyor device, partly to conceal cables, partly to serve as a stiffening means for the conveyor duct, and partly to contain a passage for any return of air, which may be employed for cooling purposes. In connection with the outlet 5 a sensor device is provided which generates a signal expressing that a product has been removed from the outlet. A control device is arranged to implement a conveyor cycle on the basis of this signal.

Figure 2A:
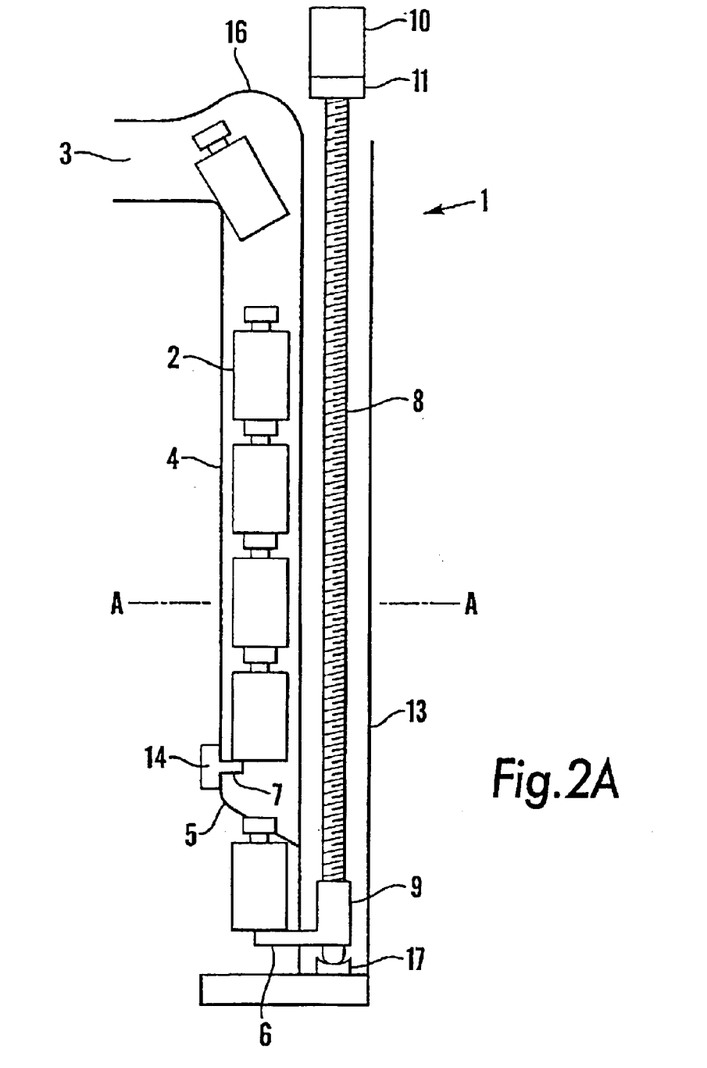
FIG. 2A is a principle view illustrating a cross section of a first embodiment of a device according to the invention.

FIG. 2A is a principle view illustrating a cross section of a first embodiment of a device according to the invention. A section of the embodiment in FIG. 2A, along the dotted line A—A and viewed from above, is illustrated as a principle view in FIG. 2B.

Figure 2B:
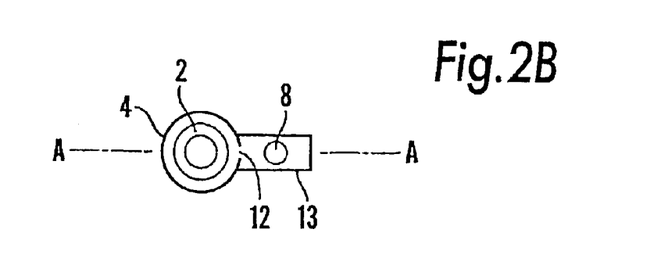
FIG. 2B is a principle view illustrating a section of the embodiment in FIG. 1A, viewed from above.

Products with two end surfaces, such as products of a substantially cylindrical shape, arrive in a preferably horizontal position and bottom first from a transport device (not shown) at a first, higher-located height level. The term end surfaces should be understood here to refer to both flat and curved end surfaces. The products 2 are especially preferably bottles or cans for drinks. Alternatively, the products 2 may be composed of other products, which should advantageously be delivered in a chilled state, such as, for example, foodstuffs, which are preferably contained in an approximately cylindrical package or container. Each product 2 has a main axis, a length up to the maximum product length, a largest cross section, a bottom portion and a top portion. The transport device feeds the products individually into the device's intake 3, which is located substantially at the first height level.

The device ensures controlled conveying of the products 2 from the intake 3 to a delivery location, or more specifically an outlet 5, at a second, lower-located height level. A substantially vertical conveyor duct or lead-down duct 4 forms a transport path from the intake 3 to the outlet 5. The outlet 5 is preferably composed of an opening in the conveyor duct's side wall, large enough to enable the product to be easily removed by hand, or of an open area in the extension of the conveyor duct.

The device comprises conveyor devices for controlled conveying of products from the intake to the outlet. The conveyor devices are arranged to convey each product in a direction parallel to the product's main axis, with the bottom portion lowest and with the top portion abutting against the bottom portion of a succeeding product.

In this embodiment the conveyor devices comprise a propulsion device and a retaining device.

The propulsion device comprises a transverse support device or seat 6, which projects through a gap 12 extending in the conveyor duct's longitudinal direction in towards the interior of the duct 4. The seat 6 is arranged to act with a force on the lower end surface of a product, and supports a product abutting against the seat's upper surface.

A sensor device (not shown) is arranged in connection with the outlet 5 in order to determine when a product is removed from the outlet 5. For this purpose a photoelectric cell may be employed in combination with a light ray, which is generated by a light source and which strikes the photoelectric cell when it is not obstructed by an object. The photoelectric cell and the light source may be provided in such a manner that the product obstructs the light ray either when it is located in the product outlet, or as the product is removed from this position. Alternatively or in addition, an electromechanical switch may be employed, for example arranged to be activated by a product when it is supported by the seat or when it is no longer supported by the seat. With this kind of solution use may be made of other kinds of sensors, for example force-sensitive semiconductor sensors.

The sensor signal is passed to a control device (not shown), comprising processing means for processing the said and other sensor signals, and for generating different control signals, including a signal for initiating a conveyor cycle by generating power to a motor 10.

The retaining device in this case is composed of a blocking device 7 comprising a hook or a catch, arranged to project into the conveyor duct and mounted at a height lower than the upper end point of the seat 6. The hook is controllably movable in a direction substantially perpendicular to the conveyor duct's longitudinal direction. The direction of travel is also preferably radial relative to the conveyor duct's cross section, with the result that the hook projects towards the middle of the duct. In this direction the hook is movable between a first position where it prevents a product from passing, and a second position where it permits a product to pass.

The hook in the blocking device 7 is preferably controllably movable by means of a spring-prestressed solenoid 14. The blocking device is so designed that the hook projects into the conveyor duct, thereby preventing a product from passing when the solenoid is in a state of rest, while the hook is retracted, thereby permitting a product to pass when the solenoid is in an energised state. As an alternative to a linear blocking device, a blocking device with rotational movement may be employed. As an alternative to a solenoid, another electromagnetic, electromechanical, pneumatic or hydraulic actuator device may be employed for the blocking device. The blocking device is designed in order to be able to withstand in the first state the force resulting from the weight of all the products located in the conveyor duct above the blocking device.

In this embodiment the propulsion device further comprises a screw 8, which extends parallel to the conveyor duct's longitudinal direction and which is rotatable by means of a motor 10, preferably via a gear device 11. An electric motor and a gear device are preferably employed for reduction of the revolutions and increase in the torque.

The lower end of the screw is mounted for free rotational movement while simultaneously preventing other movement in a plane perpendicular to the screw's axis by means of a bearing device 17.

A substantial part of the screw is externally threaded, preferably buttress threaded. On the screw's threaded part there extends a corresponding internally threaded sleeve 9 which has a transverse extension forming the seat 6. Since the seat protrudes through the gap 12 in the conveyor duct's longitudinal direction, the sleeve is prevented from rotating with the screw, and, since it extends on the threads, the sleeve is instead permitted to be moved in the direction of the gap and thereby the conveyor duct's longitudinal direction.

The seat is thereby controllably movable in a direction parallel to the conveyor duct's longitudinal direction by means of power to the motor 10. The seat's area of movement constitutes at least the area between a lower end point and an upper end point, which is more than a maximum product length from the lower end point.

In the conveyor device's state of rest, the seat is located in a lower position, corresponding to the lower end point. It thereby supports a product, which is accessible for manual removal from the outlet 5. In the conveyor device's state of rest, the blocking device 7 is in the first state, where it prevents a product from passing.

When a product is removed from the outlet, a conveyor cycle is initiated for passing the next product down to the outlet. The cycle is initiated by the said sensor/sensors and controlled by the control device by generating control signals.

Initially, the motor 10 is started in such a direction that the seat 6 is moved upwards. The operation of the motor and thereby the movement of the seat is maintained until the seat touches the bottom portion of the product which is now at the bottom and is held by the blocking device 7. This position of the seat can be determined by feedback from position sensors associated with the sleeve's or the seat's position along the screw, or without feedback by utilisation of knowledge of the rotational/angular position of the motor 10, particularly if the motor 10 is of the stepped motor type.

With the seat in this position, the motor 10 is stopped and the blocking device 7 is activated by means of the solenoid, thus causing the blocking device to be retracted and permitting a product to pass.

The motor 10 is then started in the opposite direction, thus causing the seat 6 to be moved downwards. The seat will now support a whole stack of products abutting against one another in the conveyor duct.

When the seat has reached a certain position where the product which is now at the bottom is in the process of passing the seat, measured, for example, by a position sensor associated with the sleeve's or the seat's position along the screw, the blocking device 7 is activated. The seat then forms an obstacle for the succeeding product.

The motor 10 continues to be operated in a direction, which moves the seat 6 downwards, until the seat reaches its end position, whereupon the bottom product can be removed from the outlet and the cycle can be repeated.

The motor and the solenoid are controlled by control signals generated from the control device. The control signals are generated on the basis of different sensor signals and predefined criteria, by means of a programming of the control device. The programming of the control device represents an everyday task for a person skilled in the art, based on the indications provided herein.

Figure 3:
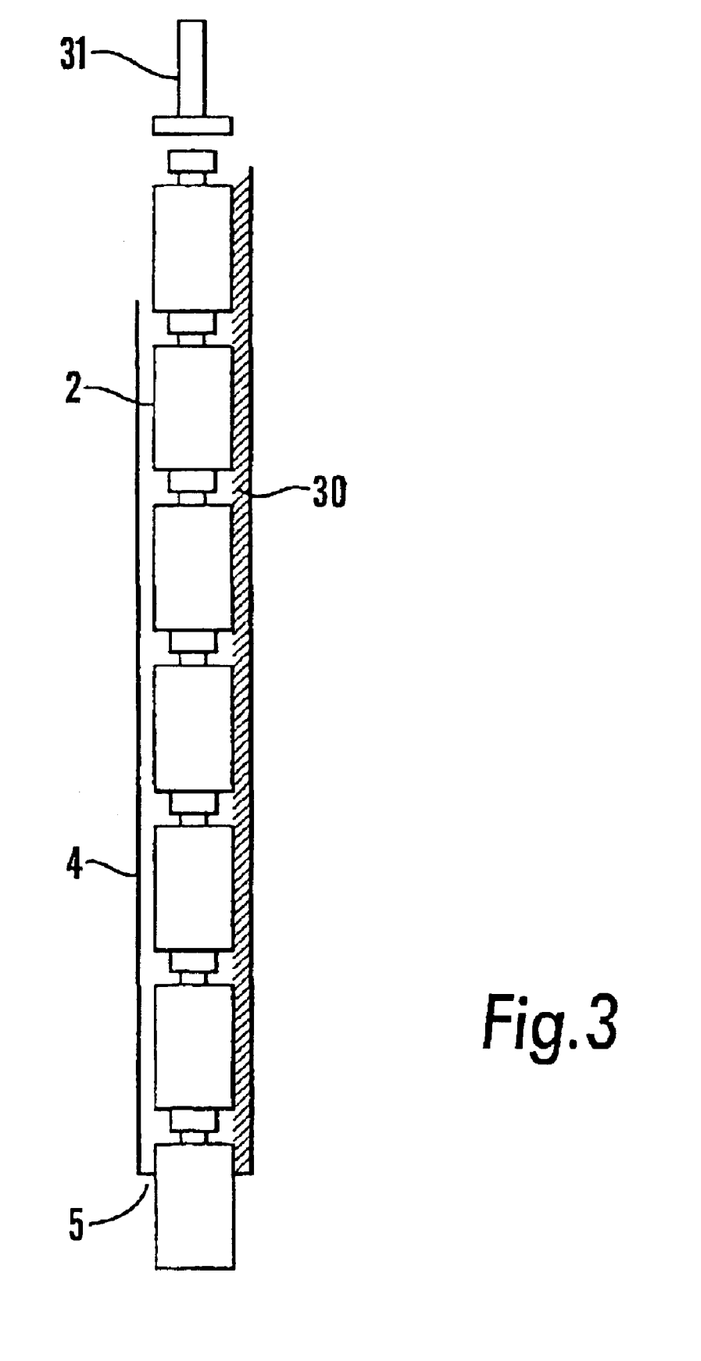
FIG. 3 is a principle view illustrating a cross section of a second embodiment of a device according to the invention.

FIG. 3 is a principle view illustrating a cross section of a second embodiment of a device according to the invention.

In this case too the conveyor devices comprise a propulsion device and a retaining device.

Here the propulsion device is composed of a piston device 31. The piston device 31 is arranged to controllably exert a force on the top portion of a product located near the first height level in the device. This force has a downward direction, parallel to the conveyor duct. The piston device preferably comprises an electric, or alternatively a pneumatic actuator. The stroke length of the piston substantially corresponds to the maximum product length.

The retaining device in this case is composed of friction means 30, arranged to overcome the products' weight, thus preventing them from falling down through the duct. The friction means extend along at least a part of the inner wall of the conveyor duct. The friction means preferably comprise a set of brushes or a brush-like layer, extending along the interior of the conveyor duct along its entire length, but only mounted in an area in the rear part of the conveyor duct's cross section, i.e. opposite the central part of the opening in the conveyor duct which forms the outlet 5. Alternatively, brushes may be mounted in only a section in the longitudinal direction, comprising the bottom part of the conveyor duct.

Figure 4:
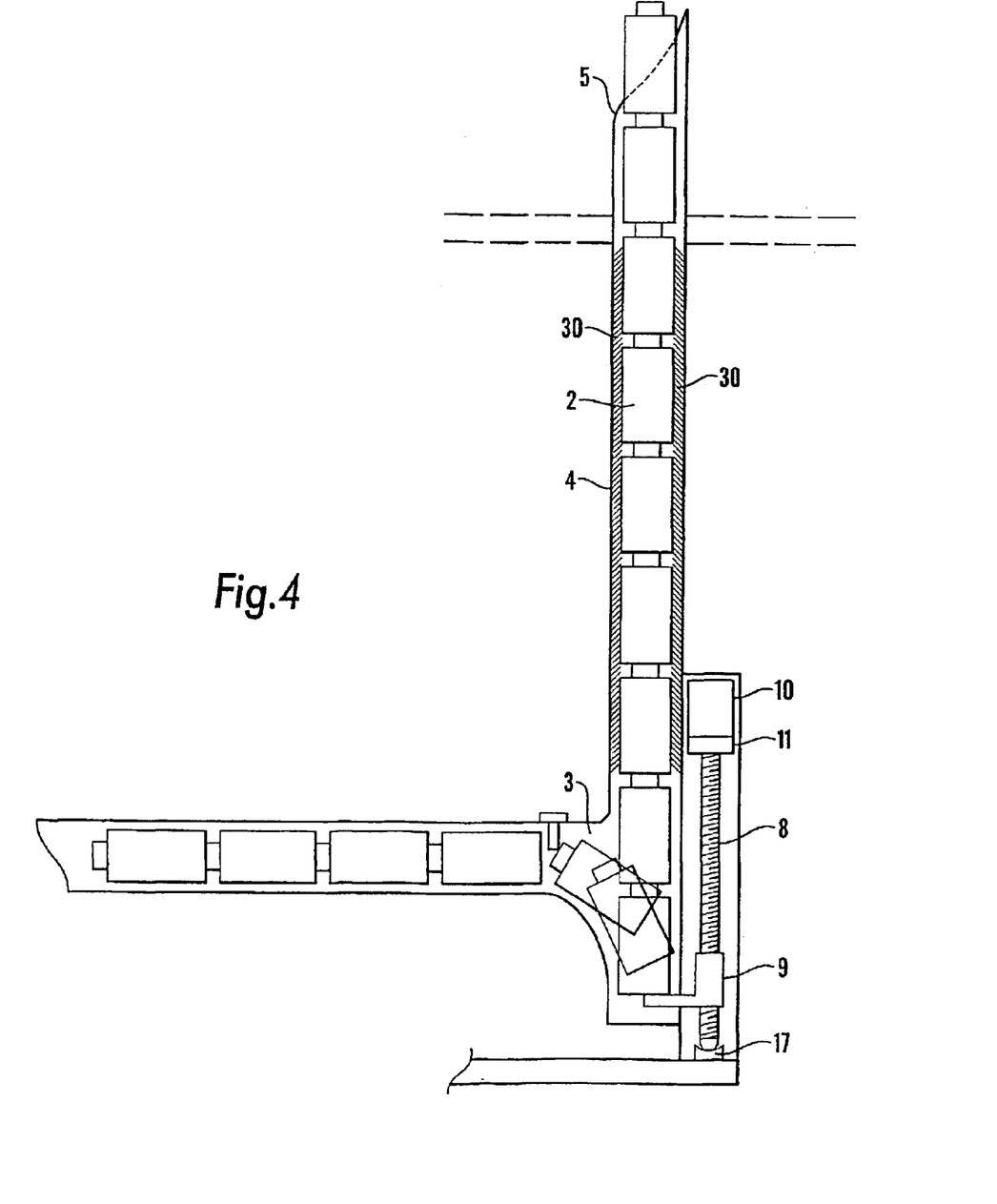
FIG. 4 is a principle view illustrating a cross section of a third embodiment of a device according to the invention.

FIG. 4 is a principle view illustrating a cross section of a third embodiment of a device according to the invention, for conveying from a first lower-located level to a second higher-located level.

In this case too the transport devices comprise a propulsion device and a retaining device. The propulsion device comprises a seat 6 and a screw 8, as in the embodiment in FIGS. 2A and 2B. The retaining devices comprise friction means as in the embodiment in FIG. 3.

The products are passed to the intake 3 bottom first, by means of a horizontal, external transport device, where an additional blocking device, corresponding to the solenoid-driven blocking device 7 illustrated in FIG. 2A, in a closed state blocks feeding to the intake, and in an open state permits a product to fall down into a well in such a manner that it assumes a vertical position in the intake 3.

Figure 5:
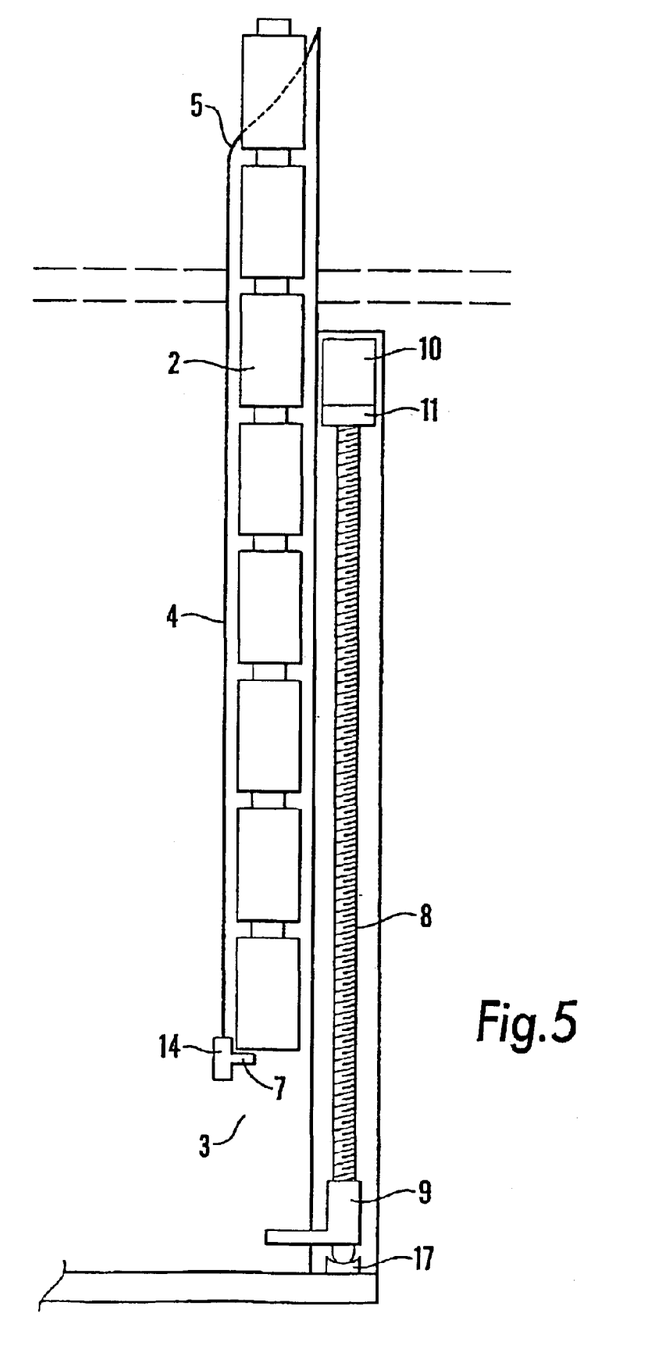
FIG. 5 is a principle view illustrating a cross section of a fourth embodiment of a device according to the invention.

FIG. 5 is a principle view illustrating a cross section of a fourth embodiment of a device according to the invention for conveying from a first lower-located level to a second higher-located level.

The embodiment illustrated in FIG. 5 corresponds to the embodiment in FIG. 4, but in this case the retaining device is composed of a blocking device 7, corresponding to the blocking device 7 in the embodiment in FIGS. 2A–2B.

Figure 6:
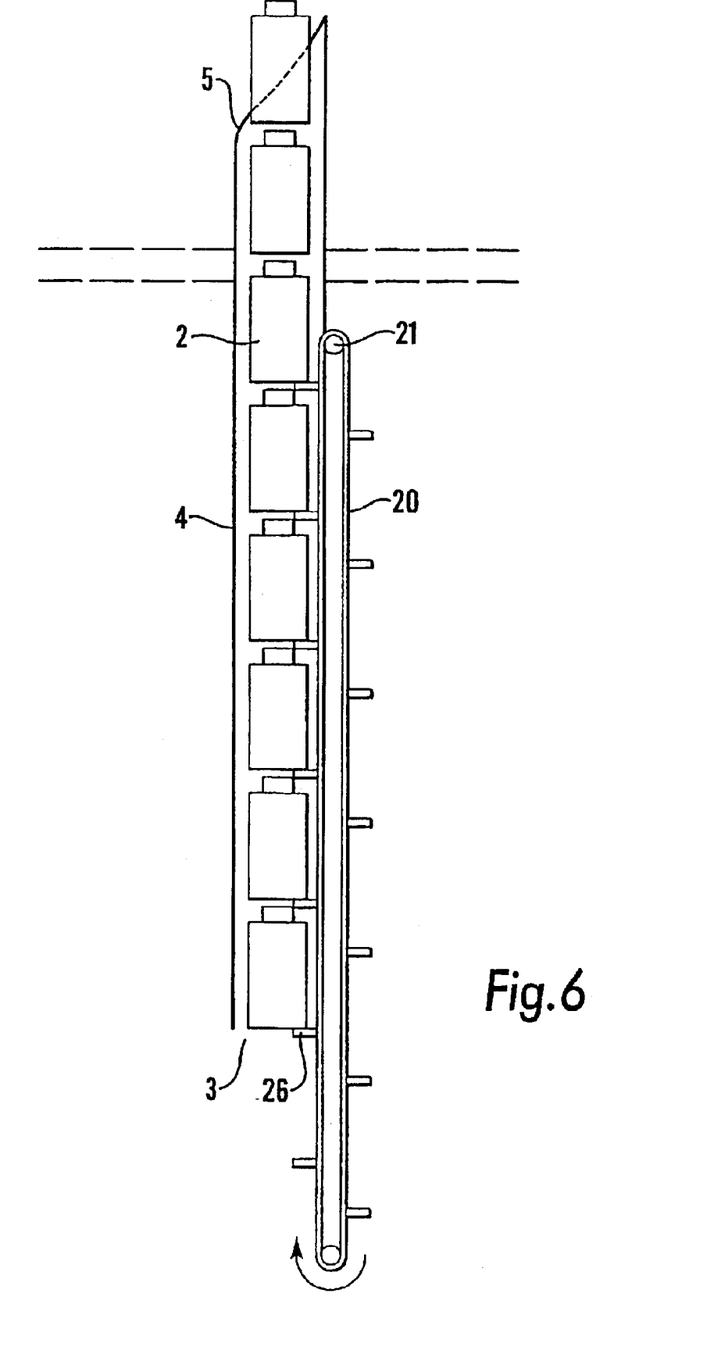
FIG. 6 is a principle view illustrating a cross section of a fifth embodiment of a device according to the invention.

FIG. 6 is a principle view illustrating a cross section of a fifth embodiment of a device according to the invention for conveying from a first lower-located level to a second higher-located level.

Here the conveyor device does not comprise separate propulsion and retaining devices, but instead is composed of an endless conveyor belt 20, mounted round two rollers and driven by at least one 21 of the rollers. The conveyor belt 20 is equipped with support devices or seats 26 which protrude from the conveyor belt through a gap 12 extending in the conveyor duct's longitudinal direction. The seats are arranged to support a product 2 located in the conveyor duct and prevent it from passing. By means of controlled guidance of the conveyor belt 20, a controlled downward transport of products 2 is provided through the conveyor duct.

In this embodiment the convey cycle will comprise a movement of the conveyor belt corresponding substantially to the length of the distance between two products, corresponding in turn to the distance between two seats.

The conveyor belt may be made of an elastic material such as, e.g., rubber. Alternatively, a chain may be employed, in which case the rollers are replaced by chain wheels.

Each seat may be attached to the conveyor belt by a hinged device (not shown). The hinged device is arranged in such a manner that the seat tilts out to a substantially 90° position in relation to the surface of the belt on the side of the conveyor belt facing the conveyor duct, and where the normal direction of travel is downwards. On the opposite side, where the normal direction of travel of the conveyor belt is upwards, the hinged device is arranged in such a manner that the seat tilts into a position substantially parallel to the belt.

By reversing the direction of the conveyor belt 20, the device illustrated in FIG. 6 can easily be modified to carry out conveying of products from a first higher-located level to a second lower-located level, where the outlet 5 and the inlet 3 exchange places.

For all embodiments of the invention the conveyor duct is equipped with an internal cross section which is slightly, but not much larger than the products' largest cross section, thus enabling the products to be passed up or down in the duct without becoming wedged. The conveyor duct is preferably provided with internal guides in the form of a number of, preferably three, longitudinal grooves projecting in from the duct walls towards the middle of the duct. The object of these is to prevent wear in the inside of the duct walls, in addition to helping to guide the products.

The conveyor duct preferably has a circular cross section. At least a section of the duct is advantageously made of a transparent material, thus effectively exposing the products contained in the duct to people in the vicinity.

When it is stated according to the invention that the conveyor duct is substantially vertical, it should be understood that the conveyor duct may also be tilted, or equipped with means for variable tilting, but nevertheless in such a manner that the vertical component of the duct's tilting is the prominent one.

For all the embodiments the device may advantageously comprise a device for setting a correct rotational position for the products, mounted between the external transport device and the intake of the device. This is particularly relevant if the products are bottles or containers equipped with a label, which for display purposes should preferably face the outlet 5. This is achieved by providing a rotational adjustment device in front of the product intake 3 at a point where the products are still located in a horizontal position. The rotational adjustment device preferably comprises two rollers, arranged to rotate in parallel with the products' main axis and across the transport direction. The rollers are equipped with axles and electric drive means in the form of at least one motor, mounted on a frame, which is also provided with electric or pneumatic lifting means. The lifting means can lift the frame vertically, with the result that a product located there is lifted up from the ordinary transport path on to the two rollers. There the rollers will rotate the product until a desired rotational position has been achieved. The desired position is established by means of optical marking on the product and an optical reader on the rotational adjustment device, where the marking is preferably composed of a bar code marking placed at a known point along the product's circumference, and where the reader is preferably composed of an infrared bar code scanner. When the desired rotational position has been achieved, the frame is lowered again by means of the lifting means.

In all the embodiments the device according to the invention may further comprise sensors for providing sensor signals, including position measurements and proximity measurements, and a control device, comprising at least a processing device and a storage device for generating control signals for controlling motors, actuators, solenoids and so on. The control device is arranged to generate the control signals on the basis of the sensor signals, and on the basis of criteria programmed in the control device and data contained in the storage device.

In addition, the control device may contain other functions, associated, for example, with temperature measurements and temperature regulation, being arranged to receive sensor signals from temperature sensors, and to transmit control signals for controlling power units in a cooling system. The control device may further be arranged to count the number of products removed from the outlet, and to detect and indicate error situations, possibly by utilising additional sensors. In particular, photoelectric cell sensors or the like may be placed at the intake for the device, which can be used to generate a signal indicating that products are not longer arriving from the transport device to the intake. The control device is also advantageously arranged to transmit and receive data, preferably digital data, to an external control system for master control and/or monitoring.

For all the embodiments the device is designed in such a manner that during normal operation the conveyor duct is at all times filled up with products. This is achieved by having the external transport device arranged to supply a new product to the conveyor duct's intake 3 as soon as there is a vacant space for a product at the top of the conveyor duct, and means that the conveyor duct is utilised efficiently for both storage and transport of products.

The device may further be equipped with light sources for lighting the conveyor duct and for producing sales-promotional display effects, and with sound sources for producing sales-promotional sound effects. The light and sound sources may be controlled by the control device, thus enabling the effects to be made dependent on the device's operating condition. For example, specific sound signals may be activated by a product being removed from the outlet.

In a practical embodiment a number of, for example three, devices according to the invention are mounted in parallel in connection with one another. In this case they may have some common or joint constructional details, including a common control device. This is particularly relevant in the case of simultaneous presentation of several different products at substantially the same place.

What is claimed is:

1. A device for controlled conveying of products (2) with two end surfaces, from a product intake (3) at a first height level to a product outlet (5) at a second height level different from the first height level, which comprises a substantially vertical conveyor duct (4) which is arranged to contain a plurality of axially stacked products, and which forms a transport path from the intake to the outlet, a sensor device, arranged to provide a signal expressing that a product has been removed from the outlet (5), conveyor devices, arranged to perform a repeatable convey cycle for controlled conveying of a product to the outlet, and a control device, arranged to implement the conveyor cycle on the basis of the said signal, where the conveyor devices comprise a propulsion device, arranged to act during a period of a conveyor cycle with a force on at least a part of an end surface of a product, and move the product a length which substantially corresponds to the length of a product, in the product's axial direction, and a retaining device, separate from said propulsion device, arranged to act for at least a period of a convey cycle with a force on at least a part of the surface of a product, in order to counteract undesirable movement due to the weight of the product.

2. The device according to claim 1, wherein the propulsion device comprises a seat (6) which protrudes through a gap extending in the conveyor duct's longitudinal direction, which seat is arranged to act with a force on the lower end surface of a product which is located on the top of the seat, and is controllably movable in a direction parallel to the conveyor duct's longitudinal direction.

3. The device according to claim 2, wherein the propulsion device also comprises a screw (8) which extends parallel to the conveyor duct's longitudinal direction, and which is rotatable by means of a motor (10), preferably via a gear device (11), on which screw there extends an internally threaded sleeve (9) with an extension which forms the seat (6), which, since it protrudes through the gap (12) in the conveyor duct's longitudinal direction, prevents the sleeve from rotating and permits the sleeve to be moved in the conveyor duct's longitudinal direction.

4. The device according to claim 1, wherein the propulsion device comprises a piston device (31), driven by an electric or pneumatic actuator, arranged to controllably exert a force on a part of an end surface of a product.

5. The device according to claim 1, wherein the retaining device comprises a blocking device (7) which is controllably movable in a direction substantially perpendicular to the conveyor duct's longitudinal direction, between a first position in which the blocking device prevents a product located above from passing, and a second position in which the blocking device permits the product to pass.

6. The device according to claim 5, wherein the blocking device (7) is controllably movable by means of a spring-prestressed electric solenoid.

7. A The device according to claim 1, wherein the retaining device comprises friction means provided on at least a portion of the inner wall of the conveyor duct, arranged to act with a frictional force substantially perpendicular from the wall, on at least a part of the surface of at least one product in the duct.

8. The device according to claim 7, wherein the friction means comprise brushes.

9. The device according to claim 1, wherein the conveyor devices comprise an endless conveyor belt (20), driven by at least one roller (21), which conveyor belt (20) is equipped with seats (26) which protrude from the conveyor belt through a gap (12) extending in the conveyor duct's longitudinal direction, which seats support a product (2), with the result that a controlled guidance of the conveyor belt (20) leads to a controlled conveying of products (2).

10. A The device according to claim 1, wherein the second height level is lower than the first height level.

11. A The device according to claim 1, wherein the second height level is higher than the first height level.

12. A The device according to claim 1, wherein it comprises additional sensors for providing sensor signals, including position measurements and/or proximity measurements, the control device comprises at least a processing device and a storage device for generating control signals for controlling motors, actuators and/or solenoids, and the control device is arranged to generate the control signals on the basis of the sensor signals, and on the basis of criteria programmed to be executed by the control device and data contained in the storage device.

13. The device according to claim 1, wherein the propulsion device acts during a period of a conveyor cycle to move the product no more than said length which substantially corresponds to the length of the product, in the product's axial direction.

* * * * *